US005421671A

United States Patent [19]
Lewis

[11] Patent Number: 5,421,671
[45] Date of Patent: Jun. 6, 1995

[54] REMOTELY MONITORED AND CONTROLLED SELF-FLUSHING SECONDARY CONTAINMENT SYSTEM

[76] Inventor: Morris E. Lewis, 6104 Joyce Dr., Camp Springs, Md. 20748

[21] Appl. No.: 919,732

[22] Filed: Jul. 31, 1992

[51] Int. Cl.⁶ .......................... E02D 3/00; E02B 3/16
[52] U.S. Cl. ...................................... 405/52; 405/53; 405/128
[58] Field of Search ...................... 405/52, 52–59, 405/128, 129

[56] References Cited

U.S. PATENT DOCUMENTS

| | | | |
|---|---|---|---|
| 3,505,820 | 4/1970 | Draper et al. | |
| 3,655,468 | 4/1972 | Bastone et al. | |
| 4,110,947 | 9/1978 | Murray et al. | 405/54 X |
| 4,639,164 | 1/1987 | Pugnale et al. | 405/54 |
| 4,682,492 | 7/1987 | Green | 405/54 X |
| 4,682,911 | 7/1987 | Moreland | 405/53 X |
| 4,787,772 | 11/1988 | Wagner | 405/53 |
| 4,798,496 | 1/1989 | Sawada | 405/53 |
| 4,818,151 | 4/1989 | Moreland | 405/303 |
| 4,819,821 | 4/1989 | Sharp | 405/53 |
| 4,871,078 | 10/1989 | Sharp | 405/53 |
| 4,915,545 | 4/1990 | Ferrari | 405/53 |
| 4,925,046 | 5/1990 | Sharp | |
| 4,978,249 | 12/1990 | Killman | 405/54 X |
| 5,017,044 | 5/1991 | Sharp | 405/53 |
| 5,030,033 | 7/1991 | Heintzelman et al. | 405/53 X |
| 5,037,239 | 8/1991 | Olsen et al. | 405/128 |
| 5,248,220 | 9/1993 | Rohringer | 405/53 |

FOREIGN PATENT DOCUMENTS

| | | | |
|---|---|---|---|
| 241351 | 7/1965 | Austria | 405/54 |
| 1102503 | 3/1961 | Germany | 405/54 |

Primary Examiner—Dennis L. Taylor

[57] ABSTRACT

A remotely monitored and controlled secondary containment system for underground storage tanks. Contamination of the soil and ground water in populated communities by gasoline and other petroleum products leaking from corroded underground iron or steel storage tanks has risen to an alarming level. This invention provides an efficient, and economically built and easily installed means for cleanup and for in-place decontamination of leaked or spilled hazardous liquids from the tank environment and for the repair of the leaking tank, without excavating the tank.

14 Claims, 3 Drawing Sheets

REMOTELY MONITORED AND CONTROLLED SELF-FLUSHING SECONDARY CONTAINMENT SYSTEM

BACKGROUND OF THE INVENTION

1. Field of the Invention

The present invention relates generally to a shock resistant, modular self flushing and self decontamination system, and more specifically, to an self flushing and self decontaminating flushing containment vessel having a novel modular sectional constructed spraying system within a subterranean leak proof environmental enclosure.

2. Description of the Prior Art

Prior secondary containment systems are widely used commercially and in industry for emergency containment of spilled or leaked hazardous liquids.

Various methods are used for building these systems. The prior art, as exemplified by U.S. Pat. No. 4,414,151 discloses A method which is used for building secondary containment vessel.

The most profound feature of the present invention is to fabricate a novel addition to state of the art secondary containment vessel, that will allow clean up of leaked or spilled product from underground storage tanks (UST's) without excavating the UST's from the ground. The prior art discloses a secondary containment vessel constructed by novel means.

Recent concerns in the public media regarding leaking storage tanks and spilled hazardous liquids have increased the need for an efficient and economical method for containment and clean-up of leaked or spilled hazardous liquids from underground storage tanks. Contamination of the soil in populated communities by gasoline and other petroleum products leaking from corroded underground iron storage tanks has risen to an alarming level. The present invention represents an improvement over the prior art by providing an efficient, economically built, and easily installed means for cleanup and decontamination of leaked or spilled hazardous liquids from underground environments.

OBJECTS AND SUMMARY OF THE INVENTION

Tanks were originally placed underground to provide safe storage for volatile liquid materials. For many years, when storage vessels failed and the liquids leaked into the ground, not much thought was given to environmental damage.

It is a primary object of the present invention to provide an on site and already installed self flushing and self decontaminating means for underground storage tanks. It is another primary object of the invention to provide an self flushing and self decontaminating fluid containment vessel constructed within a subterranean leak proof environmental enclosure that has a remotely controlled monitoring system. It is still a further object of the invention to provide an self flushing and self decontaminating apparatus wherein the storage tank and subterranean leak proof structure, can be efficiently and effectively decontaminated, with minimal disruption to normal operations.

The modular self flushing and self decontaminating flushing containment vessel within its hole enclosure includes the self decontaminating apparatus, a flushing system for cleaning leaked product from within the hole enclosure, a fluid recovery system positioned adjacent to the modular self flushing and self decontaminating fluids containment vessel for decontaminating leaks, and cable-mounted anchors to secure the underground storage tank securely in place.

BRIEF DESCRIPTION OF THE DRAWINGS

The foregoing and other objects, aspects, uses, and advantages of the present invention will be more fully appreciated as the same becomes better understood when considered in connection with the following accompanying

FIG. 2 illustrates a perspective overhead frontal/side view of installed underground storage tanks situated in a remotely monitored and controlled self-flushing secondary containment system with a leak signal from a recovery/monitoring well being transmitted by radio wave to the decontamination monitoring receiver and micro controller in the service station. The signal is then transmitted by way of telephone lines, cellular telephone, radio, satellite, or any other transmission means, to the far away Remote Monitoring Station (RMS), from where the entire monitoring system is remotely controlled and from where the decontamination and flushing system signal is processed, and responded to.

DESCRIPTION OF THE PREFERRED EMBODIMENT

Figure 1:
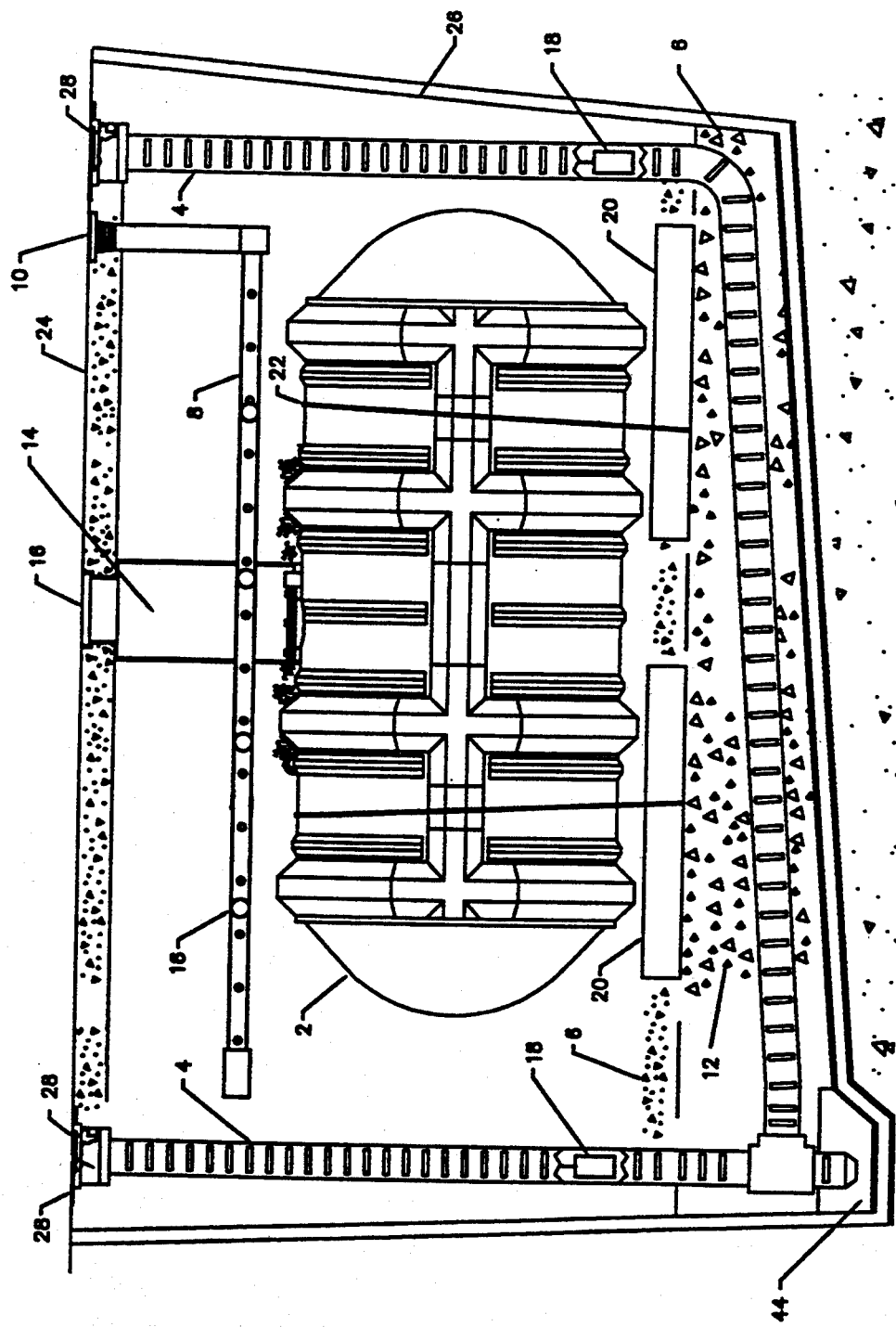
FIG. 1 illustrates a diagram of the side view of an installed underground storage tank situated in a remotely monitored and controlled self-flushing secondary containment system in accordance with the present invention.

Referring now to the drawings, like reference numerals represent identical or corresponding parts throughout the several views.

In FIG. 1, there is shown an underground storage tank 2, and modular self flushing and self decontaminating flushing containment vessel mounted in a secondary containment hole enclosure 24 holding pea gravel or the like 6. The tank 2 may store liquids such as fuel oil or gasoline. Adjacent to the tank 2 in the secondary containment enclosure 24 is a flushing system 8 with a cap 10 thereon. A drainage pipe configuration, which is part of the fluid recovery system 12 is connected to the monitoring wells 4 at the bottom of the hole. A utility well receptacle 14 is supported on the tank 2 and operatively connected thereto. The utility well receptacle 14 has a cap 16. In addition to providing access to the tank 2, the utility well receptacle 14 serves as an auxiliary tank for spills and constitutes an added safety factor for handling excess liquid overflow. Also, adjacent to the tank 2 is a flushing system 8 that extends across the hole, above and/or adjacent to the underground storage tank 2. The flushing system 8 has a cap 10. In the fluid recovery structure 12, there are conventional decontamination sensors 18 for monitoring the area within the enclosure 24. Deadman anchor weights 20 are positioned in the bottom area of the gravel-filled hole enclosure 24. Suitable cables 22 are attached and swing upwardly and over the tank 2 and firmly grasp it in a secure manner. The anchor arrangement 20–22 with suitable weights add to the shock resistant environment of the gravel-filled hole enclosure 24. A hard surface pavement such as concrete with the respective cap openings, furnishes a cover for the hole enclosure 24. Further, to add to the leak proof environment of the secondary containment hole enclosure 24, a synthetic membrane liner 26 consisting of a synthetic material resistant to corrosion by gasoline, other hydrocarbons, and chemicals, such as a butyl rubber, vinyl ester or unsaturated polyester is inserted into the hole enclosure 24 during its construction. The liner 26 is used to collect and contain these liquids which might leak from the tank 2, and the fluids from the self flushing and self decontaminating system 8. High quality sensors 18, of varying type, are used to detect leaks by detecting product or the vapors from the leaked product. The sensors sense the leak and emit a detection signal which is then carried over the wires to the transmitter 28 at the top of the well or by way of other wires 36 to the receiver/microprocessor system 38 located in an adjacent building. There the signal is further transmitted by radio wave 30, by satellite communications 34, by cellular telephone, or by regular telephone lines 32 or by other means of communications to the remote monitoring station 40. There, it is received and processed by the monitoring computer system 42, and appropriate response measures are taken.

Figure 2:
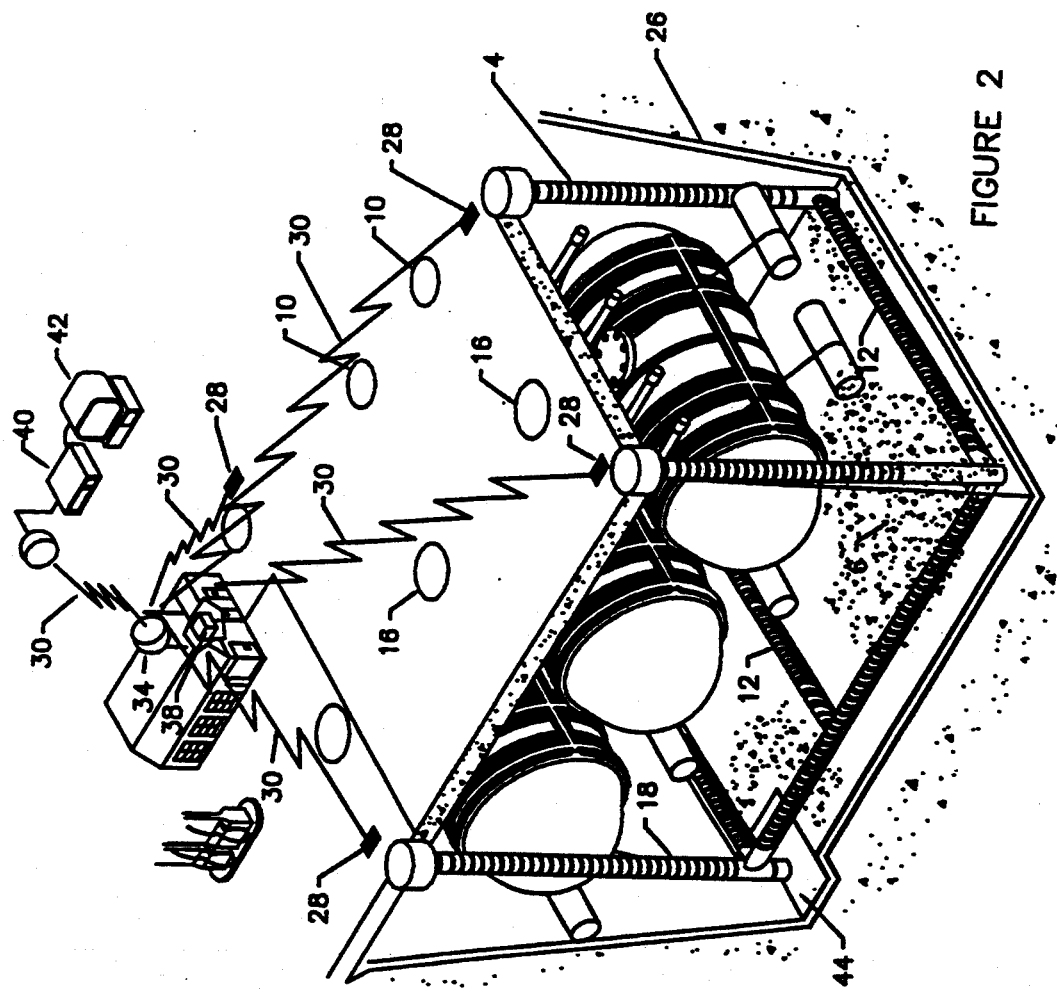

FIG. 2 illustrates a perspective overhead frontal/side view of installed underground storage tanks situated in a remotely monitored and controlled self-flushing secondary containment system with a leak signal from a recovery/monitoring well being transmitted by radio wave 30 to the decontamination monitoring receiver 34 and micro controller 38 in the service station. The signal is then transmitted by way of telephone lines, cellular telephone, radio, satellite, or any other transmission means, to the far away Remote Monitoring Station (RMS) 40, from where the entire monitoring system is remotely controlled and from where the decontamination and flushing system signal is processed 42, and responded to. The leaked product poses not threat to the surrounding environment due to the fact that the product is contained within the leak proof secondary containment hole 24. Thus allowing response personnel to vacuum and store the remaining product from the tank 2. The leaked product, which flows through the pea gravel 6, is removed from the secondary containment hole byway of inserting a hose which is connected to a suitable pump and tank, into the large fluid recovery tube 4, down to the sump 44. When all leaked product is pumped from the hole, the tank 2 is repaired by way of a person entering the cleaned out tank or by remotely controlled means and patching the leak. The self-flushing system is activated by way of connecting a hose to the connector of the tank flushing system 8,10 and 16 whereupon, a fluid for decontamination, bioremediation and flushing is sprayed over the tank 2 and through the pea gravel 6, where it drains by the to the bottom of the hole, on to the sump 44, whereupon, it is pumped out. The system is then flushed with a suitable detergent in the same manner as stated above.

Figure 3:
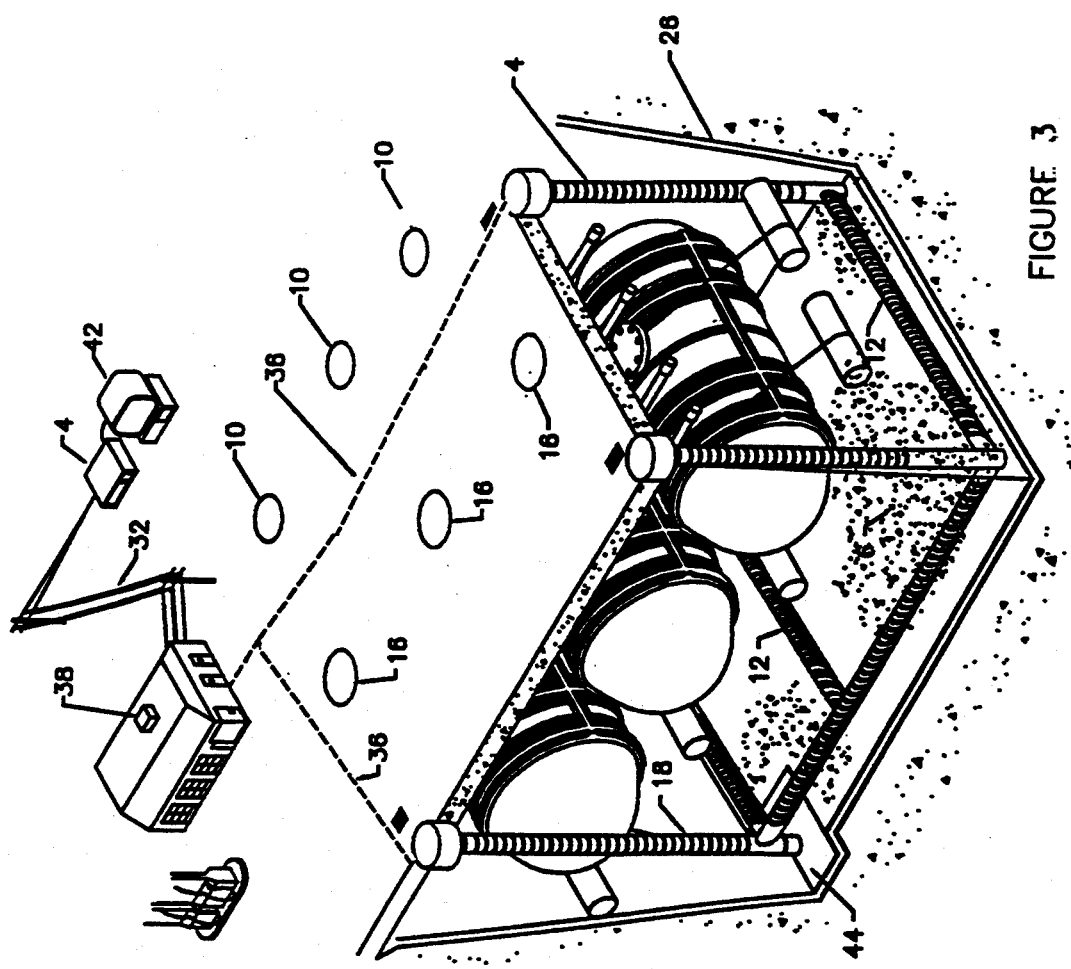
FIG. 3 illustrates the same situation as in FIG. 2, with the exception of the leak signal traveling by way of hardwire or fiber optic cabling from the recovery/monitoring well and to the decontamination and flushing system monitoring receiver and microprocessor in the station and by way of telephone lines to the RMS.

FIG. 3 illustrates a perspective overhead frontal/side view of installed underground storage tanks situated in a remotely monitored and controlled self-flushing secondary containment system as in FIG. 2. However, the leak signal from the recovery/monitoring well is transmitted by way of hard wire or fiber optic cabling 36, to the decontamination monitoring receiver and micro controller in the service station 38. The signal is then transmitted by way of telephone lines 32, cellular telephone, radio, satellite, or any other transmission means, to the far away Remote Monitoring Station (RMS) 40, from where the entire monitoring system is remotely controlled and from where the decontamination and flushing system signal is processed 42, and responded to as stated in FIG. 2.

What is claimed is:

1. An underground storage tank self-flushing secondary containment system comprising in combination:
    a cavity in the ground, defining a substantial interior volume for a hazardous fluids and vapors and decontaminating fluids or vapors containment means, the bottom of said cavity being sloped and having a fluid conveying means at its base;
    liner means impervious for containment of hazardous fluids and vapors, and decontaminating fluids and vapors, the liner and sloped bottom together constitute a flushing containment vessel for the hazardous liquids and vapors decontamination system;
    cushioning means placed in the cavity between the ground and said liner means serving as a buffer to negate the friction and puncture effects of the ground on the liner means at the base of the cavity;
    a recovery means for conveying air, vapor, fluids and other debris in a desired direction, being positioned in the flushing containment vessel and located in a manner consistent with allowing decontaminating and flushing fluids to flow to sump means,
    the sump means located at the lowest point in the flushing containment vessel for collecting and allowing for the recovery of decontaminating and flushing, vapor, fluids, debris and other matter by way of conveying means;
    an underground storage tank means suspended in a permeable means, said permeable means having a series of unevenly shaped and sized means that will allow leak s or spilled hazardous liquids, and vapor and decontaminating fluids, vapor, and microbes, and flushing fluids and vapors, to flow through cavities contained within;
    a decontaminating means comprising trunk feeder means, tank exterior spraying means, and tank interior spraying means, for conveying decontaminating fluids, vapors, microbes or other agents to the area designated for decontamination, said decontaminating means being located inside of or in close proximity to the outside of the underground storage tank, and positioned in such a manner as to allow for the disbursement of decontaminating fluids, vapors, and other agents along the exterior walls, the interior walls, and through the leakage cavity of the underground storage tank, the piping trench of the tank system, and through the permeable material means within the flushing containment vessel;
    a flushing means comprising trunk feeder means, and exterior spraying means, which will convey flushing fluids, vapor, or other agents to the exterior of the tank, said flushing means being located in such a manner as to allow for the disbursement of flushing fluids, vapors, and other agents along the exterior walls of the underground storage tank, the piping trench of the tank system, and throughout the permeable material means within the flushing containment vessel;
    sensor means located in or adjacent to the recovery means for determining the type and quantity of contamination, and other data relating to the hazardous vapor, and hazardous liquids contained within or in proximity to the recovery means located within the flushing containment vessel, the sensor means being connected to data controllers means, and data processing means, by way of suitable signals transmission and receiving means;

a monitoring and controlling means, providing necessary monitoring, controlling, power, signal and voltage means and other required monitoring and controlling means necessary to monitor and control the underground storage tang decontamination and flushing systems;

a vapor recovery means, for introducing inlet airflow through any perforated, or open member of the system, and venting, vacuuming or otherwise recover vapors from the decontamination system.

2. The invention in accordance with claim 1 wherein the bottom of the cavity is arranged in a sloped-trenched configuration, constituting, the base of the flushing containment vessel, which is located in the interior and along the base of a similarly contoured, membraned underground storage tank secondary containment vessel, for retaining and conveying decontaminating and flushing fluids and other fluidic materials to the recovery means.

3. The invention in accordance with claim 1 wherein the fluid recovery means are axially, elongated perforated pipe members, placed along the length of, to the lower points of, the sloped-trenched member, located in the contoured base of the flushing containment vessel and provides a means for the recovered fluids to travel on to a portion of the sump means, located at the lowest point within the system.

4. The invention in accordance with claim 1 wherein the permeable materials base, is grated pea gravel or other similar unevenly shaped or sized means, arranged in the same manner as the sloped-trenched contoured base of the flushing containment vessel.

5. The invention in accordance with claim 1 wherein the decontaminating trunk feeder means communicate with the decontaminating spray means, and are non-perforated fluid conveying means which serve to convey the decontaminating fluids, or agents from the mobile service and maintenance means, through a manifold system means to the decontaminating spray means.

6. The invention in accordance with claim 1 wherein, the decontaminating exterior spraying means communicate with the decontaminating trunk means, and are perforated, elongated, tubular, fluid conveying means which serve as a means of releasing decontaminating agents, microbes or other remediating agents along the outside tank and piping surfaces, and throughout the flushing containment vessel, and act as means for cleaning the leaked product from the outside tank and piping surface means, the surface of the permeable material and other components within the flushing containment vessel and the decontaminating interior spray means, disburses fluids, vapors, microbes and other agents through the leakage cavity of the underground storage tank, on to the recovery means.

7. The invention in accordance with claim 1 wherein, the flushing trunk means communicate with the flushing spraying means, and are non-perforated fluid conveying means which serve to convey the flushing fluids, or agents to the flushing spray means.

8. The invention in,accordance with claim 1 wherein, the flushing spray means communicate with flushing trunk means and are perforated fluid conveying means which flush the decontaminating agents and the leaked product from the outside surface of the tank and piping means, the surface of the permeable material and other components within the enclosure means, on to the recovery means.

9. The invention in accordance with claim 1 wherein, the decontamination sensor means are located within or adjacent to the fluid recovery piping, and serve to sense the effects of the decontaminating agents on the leaked hazardous liquids and vapors, and also assist in detecting leaks from underground storage tanks, and from piping into the flushing containment vessel.

10. The invention in accordance with claim 1 whereby, the sensors means being connected by way of suitable cabling means or signals conveying means, to suitable analysis and controlling means, wherein, analysis and controlling signals are transmitted over wire means and radio transmission means to a receiving, processing and local control means, whereupon the processed signal is further transmitted over long distance wire means and long distance radio transmission means, to regional remote control station.

11. The invention in accordance with claim 1 wherein data controller means communicate with the sensor means, whereby the signal is processed and responded to, and the remotely controlled sensor is interrogated and the decontamination and flushing equipment is monitored and further controlled as needed.

12. The invention in accordance with claim 1 wherein data processing means communicate with data controller means whereby data from the decontaminating analysis process within the flushing containment vessel is evaluated with the detection signal transmitted over wire means and radio transmission means to receiving, processing and local control means, whereupon the processed signal is further transmitted over long distance wire means and long distance radio transmission means, to regional remote control station, whereby the signal is processed and responded to, and the remotely controlled sensor is interrogated and the flushing and decontamination equipment is monitored and further controlled as desired.

13. The invention in accordance with claim 1 wherein the monitoring/control members provide necessary local and remote monitoring of decontamination and flushing system components and provides control over the decontamination and flushing system as desired.

14. The invention in accordance with claim 4 wherein the permeable materials base, is grated pea gravel or similar unevenly shaped and sized means, the surface of said permeable materials means form the bio-reactor means, whereby microbes, bacteria, enzymes, or other such matter will cultivate and serve as the bio-remediation means for the system.

* * * * *